United States Patent Office 3,689,315
Patented Sept. 5, 1972

3,689,315
COATED ELECTRIC CONDUCTOR
Jean-Pierre Quentin, Lyon, and Michel Ruaud, Villeneuve par Ternay, France, assignors to Rhone-Poulenc S.A., Paris, France
No Drawing. Filed Feb. 27, 1969, Ser. No. 803,064
Claims priority, application France, Feb. 29, 1968, 141,830
Int. Cl. B44d 1/42; B01k 3/04
U.S. Cl. 117—228                5 Claims

ABSTRACT OF THE DISCLOSURE

Copolymers of vinyl alcohol with comonomers containing ion-exchange groupings are useful for coating electric conductors, particularly electrodes used in the electrolytic deionization of polar liquids.

---

The present invention relates to ion-exchange copolymers and their use.

It is known to employ granular ion-exchange resins for deionising liquids of various natures. For such deionising operations, it is also well known to employ ion-exchange membranes for the separation of the various compartments in electrodialysis cells. Thus, in French Patent No. 1,381,307 and its first addition No. 86,545, the deionisation of highly polar liquids such as nitrobenzene by a process of electrodialysis in a cell comprising three compartments separated by ion-exchange membranes has been described.

In French Patent No. 1,441,772, electrical apparatus utilising liquid media of high resistivity have been described, consisting of a tank for the liquid and of two electrodes each covered by an ion-exchange membrane, these two electrodes having the function of deionising the liquid, of maintaining it in the deionised state, and of creating an intense electrical field therein. The presence of ion-exchange resins on the surface of the metal electrodes is essential in the case of apparatus operating under an intense electric field (higher than 10 kv./cm.), because when a deionised highly polar liquid is subjected to such a field between metal electrodes, a large number of fresh ions are generally formed and the resistivity of the liquid drops considerably.

The attachment of ion-exchange membranes to electrodes by the technique described in French Patent No. 1,441,772 is effected by an adhesive, by a metal locking ring, or by hydraulic pressure. The membranes may also be attached to an inert support and the voltage may be applied to these membranes through a conductive member. However, it is difficult to apply a membrane in a regular manner to supports of rather complex form.

In addition, regardles of which method is chosen to attach the membrane, it is found that the electric field obtaining in the dielectric liquid shows distortions in the neighbourhood of the means for attachment of the membrane. It is also found that, under the action of intense electric fields, the membrane undergoes deformations which vary in extent in accordance with the manner in which the membrane is attached, and that these deformations also result in distortions of the electric field. Now, in certain applications, electric field distortions must be prevented. This is the case notably in electro-optical sound recording (see Addition 86,545 to French Patent No. 1,381,307), in which it is necessary to have an absolutely uniform electric field, which makes it necessary that the surfaces of the electrodes should be absolutely plane.

It has now been found, and this forms the subject of the present invention, that these problems of deionisation in an intense electric field may be resolved by employing as electrodes a composite assembly consisting of any support entirely or partially covered by a layer of a particular type of ion-exchange resin which adheres to the support. In the following, this layer of ion-exchange resin is referred to as an ion-exchange varnish.

In accordance with the present invention, the ion-exchange resin constituting the varnish is a copolymer of vinyl alcohol with a comonomer containing an ion-exchange grouping. This copolymer may optionally be crosslinked. It may also be a terpolymer with monomers which promote adhesion to the support, such as, for example, maleic or crotonic acid or anhydride.

As comonomers having cation exchange groupings, there may be mentioned more particularly vinylsulphonic, vinylphosphonic, acrylic and methacrylic acids, and their salts.

As comonomers having anion exchange groupings there may be mentioned more particularly monomers containing a quaternised nitrogen atom, such as quaternised vinylpyridine (or vinyl-N-alkylpyridinium salt) or quaternised dimethylaminostyrene.

The vinyl alcohol content of the copolymers may be from 50% to 99% by weight, preferably from 80% to 96%. Their reduced viscosity, measured in dimethylsulphoxide at 25° C., for a copolymer concentration of 5 g./l., is from 10 to 500 cc./g., and preferably from 30 to 200 cc./g.

The exact nature of the copolymer employed depends in practice upon the application envisaged for the ion-exchange varnish.

The copolymers of vinyl alcohol and ion-exchange monomers which may be employed in the present invention may be prepared by processes known per se. Thus, copolymers of vinyl alcohol and of salts of vinylsulphonic acid are generally prepared by saponification of copolymers of vinyl esters and vinylsulphonic acid salts, which are themselves prepared by the technique described by Kern (Macromolekulare Chemie 32, 37–44 (1959)).

Copolymers of vinyl alcohol and monomers containing a quaternised nitrogen atom are generally prepared by quaternisation of copolymers of vinyl alcohol and of a vinyl monomer containing a tertiary nitrogen atom, which are themselves prepared by saponification of copolymers of vinyl esters. The latter copolymers may be prepared, for example, by the processes described in French Patents Nos. 1,120,291, 1,177,509 and 1,215,655.

As supports which may be coated with the ion-exchange varnish, there may be mentioned more particularly metals, including metal alloys, graphite, glass, and natural or synthetic polymers optionally containing fillers.

In order to fix the ion-exchange varnish to the support, the latter is coated with a solution of the said varnish, and the solvent is evaporated, optionally at elevated temperature, from the coating layer obtained. In many cases, the coating of the support with a solution of the varnish may be effected by simply dipping the support into the solution.

During or after these operations of coating the support, a cross-linking of the varnish may also be effected. This crosslinking is advantageously effected by incorporating a crosslinking agent into the varnish solution before the coating of the support and by thereafter heating the support coated with the varnish solution. As crosslinking agents which may be employed, there may be mentioned the α-chlorinated polyethers, succinic anhydride and 2,4-diisocyanatotoluene.

The composite materials according to the invention, consisting of a support coated with an ion-exchange varnish, may be employed as electrodes. The support employed is then advantageously an electrically conductive material. If, on the other hand, the support is not an electrical conductor, it is then necessary to provide the electrode with a ring or equivalent means to enable the ion-exchange varnish to be connected to the remainder of the electrical circuit to which the electrode belongs.

When the electrodes based upon composite material according to the invention are to be employed in a distortion-free electric field, it is advantageous to employ a non-porous support.

The electrodes coated with a varnish according to the invention afford many advantages over electrodes coated with membranes as described in French Patent No. 1,441,772. In the first place, electrodes of various forms may be produced. Moreover, electrodes suitable for use in miniature devices can be more conveniently produced, because separate securing systems or operations are not required. Moreover, unlike electrodes comprising a membrane secured by a collar or by hydraulic pressure, there is no danger of warping of the ion-exchange surface, which warping may be produced, for example, by electrostatic pressure caused by intense electric fields. It is also easier to obtain electrodes having an extremely plane surface, so that the compartments in the Kerr cells (see Addition No. 86,545 to French Patent No. 1,381,307) which serve for electro-optical sound recording may be omitted. The absence of adhesive between the electrode and the ion-exchanger reduces the Joule effect in the electrode and results in a better distribution of the electric current, whereby the distortions of the electric field in the liquid are reduced. Finally, the ion-exchange varnishes according to the invention exhibit a small loss angle.

The techniques of deionisation of polar liquids with the aid of the electrodes according to the invention are the same as those described in French Patent No. 1,441,772. It is also possible to employ in combination an electrode according to the invention and an electrode as used in earlier processes.

The use of composite materials comprising an ion-exchange varnish according to the present invention, although particularly advantageous in the aforesaid deionisation applications, is not however, limited in any way to these applications. Thus, ion-exchange varnishes may be employed for the internal coating of receptacles intended to contain deionised liquids.

The following examples show how the invention may be put into practice.

EXAMPLE 1

(A) Preparation of an ion-exchange varnish solution based upon sulphonic acid resin (a) Copolymerisation.—In 300 cc. of dimethylsulphoxide 89 g. of vinyl acetate and 14 g. of sodium vinylsulphonate having a purity of 74.5% are dissolved. The solution is heated to 60° C., 0.3 g. of azobisisobutyronitrile is added, and stirring is continued for 20 hours. The whole is then poured into one litre of isopropanol, the mixture is filtered, and the precipitate is washed with 3 × 500 cc. of diethyl ether and dried in vacuo (100 mm. Hg) at 40° C. 76 g. of copolymer are thus obtained.

(b) Saponification.—To 400 cc. of a solution of 8.4 g. of potassium hydroxide in methanol, a solution of 70 g. of the aforesaid copolymer in 1200 cc. of methanol is added in 2 hours at 50° C. with stirring. Stirring is continued for 2 hours 30 minutes at a temperature of 50° C. and the product is filtered and dried as before, 39 g. of copolymer are obtained.

(c) Acidification.—A 15% aqueous solution of preceding copolymer is passed through a 150-cc. column filled with an ion-exchange resin consisting of sulphonated polystyrene in acid form (sold under the trademark Amberlite IR–120). After 15 successive passages, the acidity of the solution becomes constant and equal to 1.8 meq./g. of dry resin.

(d) Preparation of the varnish solution.—To this acidified aqueous solution are added 50% of methanol, to make up the varnish solution.

(B) Preparation of the electrodes

A mushroom-shaped stainless-steel member is secured to a horizontal rotating spindle and is dipped into the varnish solution obtained as above. It is maintained in this solution for 30 seconds and dried under a light current of nitrogen in the absence of dust, the rotation being maintained until the varnish has set. Drying is then completed by disposing the electrode for 6 hours in a desiccator under a vacuum of 5 mm. Hg in the presence of phosphoric anhydride.

In order to obtain a thicker varnish layer, the same coating operations are repeated a number of times. A series of electrodes is thus obtained, the varnish layers of which vary in thickness from 10 to 100 microns.

(C) Deionisation of nitrobenzene

The apparatus used comprises a tank filled with nitrobenzene, a cathode such as that prepared in the foregoing and an anion exchange membrane of the polystyrene type comprising quaternary ammonium groupings (membrane marketed by American Machine & Foundry Corp. under the reference A 104 B) having a theoretical exchange capacity of 1.3 meq./g., which membrane is adhesively secured to a metal electrode. The nitrobenzene employed is an analytically pure product having a resistivity in the neighbourhood of $10^6 \Omega$-cm. In the course of the deionisation, the electric field is constantly higher than 10 kv./cm. and the resistivity of the nitrobenzene falls to $10^{12} \Omega$-cm. The varnish adheres well to the electrode.

EXAMPLE 2

(A) Preparation of an anion-exchange varnish solution based upon resin having quaternary ammonium groupings (a) Copolymerisation.—To 1.2 litre of a mixture of equal volumes of water and t-butanol are added 276 cc. of vinyl acetate and 31.5 cc. of p-vinylpyridine. The temperature is raised to 60° C. for one hour, and 3 g. of azobisisobutyronitrile are then added. The heating and the stirring are continued for 24 hours, and 3 l. of water are then poured in. The t-butanol is evaporated on the water bath and 200 cc. of a 10% aqueous NaCl solution are added. The product is filtered off, washed with 2 litres of water and dried at 60° C. under 100 mm. Hg 202 g. of copylymer are obtained.

(b) Saponification.—To 12 g. of potassium hydroxide in solution in 300 cc. of methanol, a solution of 98 g. of the preceding copolymer in 1.4 l. of methanol at 50° C., is gradually added in 2 hours 30 minutes. Stirring is continued at the same temperature for a further 2 hours 30 minutes. The mixture is then cooled, filtered, washed with 1 l. of methanol, and dried at 50° C. under 100 mm. Hg 87 g. of copolymer are obtained.

(c) Quaternisation.—85 g. of this copolymer and 85 cc. of methyliodide are dissolved in one litre of dimethylsulphoxide, and stirring and heating are continued for 20 hours at 60° C. The product is poured into a mixture of 6 l. of methanol and 2 l. of diethyl ether. The precipitated product is filtered off, washed with 4 l. of the same mixture of methanol and diethylether, redissolved in 1.5 l. of water, and reprecipitated with 4 l. of the same methanol-diethylether mixture. 102 g. of copolymer having a theoretical exchange capacity of 0.6 meq./g. of dry resin are obtained.

(d) To a solution of 15 g. of this copolymer in 100 cc. of water 20 cc. of methanol are added, to make up the varnish solution.

(B) Preparation of the electrodes

The procedure of Example 1 is adopted. The varnish layer is 16µ thick.

(C) Deionisation of nitrobenzene

The apparatus used comprises a tank filled with nitrobenzene, the previously prepared anode, and a cation exchange membrane of the sulphonated polystyrene type (marketed by American Machine & Foundry Corp. under the reference C 103 C), which has a theoretical exchange capacity of 1.3 meq./g., which membrane is adhesively secured to a metal electrode. In the course of the deionisation, the electric field is gradually varied in 8 days from 10 to 450 kv./cm. The resistivity of the nitrobenzene, which was initially about $10^6 \Omega$-cm., falls to about $10^{12} \Omega$-cm. The varnish adheres well to the support.

EXAMPLE 3

(A) Preparation of a cation exchange varnish solution based upon acrylic acid resin (a) Copolymerisation.—95 g. of vinyl acetate and 5 g. of acrylic acid are dissolved in 400 cc. of t-butanol. The mixture is heated to 60° C., 0.3 g. of azobisisobutyronitrile is added, the mixture is then stirred for 20 hours. The whole is then poured into 700 cc. of heptane, and the precipitated product is filtered off, and dried in vacuo (100 mm. Hg) at 40° C. 88.5 g. of copolymer are thus obtained.

(b) Saponification.—To 500 cc. of a solution of 10.2 g. of potassium hydroxide in methanol, a solution of 85 g. of the preceding copolymer in 1 l. of methanol is added in 2 hours at 50° C. with stirring. The temperature and the stirring are maintained for 3 hours 30 minutes at 50° C., and the whole is then poured into 4 l. of ethyl alcohol. The precipitate is filtered off, washed with 3× 500 cc. of ethanol, and dried in vacuo (100 mm. Hg) at 40° C. 44 g. of copolymer are obtained.

(c) Acidification.—50 cc. of a 5% aqueous solution of the preceding copolymer are stirred for 6 hours at ambient temperature with 80 cc. of resin having a carboxylic acid function, obtained by copolymerisation of methacrylic acid and divinylbenzene (sold under the trademark Amberlite CG–50). After centrifuging to remove the resin, the acidity of the solution is 1.85 meq./g. of dry copolymer.

(d) Preparation of the varnish solution.—To this acidified aqueous solution 20% of methanol is added to make the varnish solution.

(B) Preparation of the electrodes

The procedure of Example 1 is followed. The varnish layer is 100μ thick.

(C) Deionisation of nitrobenzene

An electrode coated with a varnish according to the present example behaves similarly to the electrode of Example 1.

EXAMPLE 4

(A) Preparation of a cation-exchange varnish solution based upon a resin containing phosphonic acid groupings (a) Copolymerisation.—To 100 cc. of a mixture of water and t-butanol in equal volumes, 21.5 g. of vinyl acetate and 4.1 g. of ethyl vinylphosphonate are added. The temperature is raised to 60° C. for 30 minutes and 0.5 g. of azobisisobutyronitrile is added. Heating and stirring are continued for 20 hours, and the product is then poured into 1 l. of water and the t-butanol is evaporated on the water batch. The precipitate is filtered off, washed with 1 l. of water, and dried in vacuo (100 mm. Hg) at 50° C. 10.7 g. of copolymer are obtained.

(b) Saponification.—To 1 g. of potassium hydroxide in solution in 30 cc. of methanol, a solution of 8 g. of the preceding copolymer in 115 cc. of methanol at 50° C. is added in 10 minutes, and the stirring and the temperature are maintained constant for 5 hours. After cooling, 500 cc. of isopropanol are added, and the precipitated product is filtered off, washed with 300 cc. of isopropanol, and dried in vacuo (100 mm. Hg) at 50° C. 4 g. of copolymer are obtained.

(c) Acidification.—A 5% aqueous solution of the preceding copolymer is passed through a column containing 150 cc. of an ion-exchange resin consisting of sulphonated polystyrene in acid form (sold under the trademark Amberlite IR–120). After 11 successive passages, the acidity of the solution becomes constant and equal to 2 meq./g. of dry resin.

(d) Preparation of the varnish solution.—To this acidified aqueous solution are added 20% of methanol, to make the varnish solution.

(B) Preparation of the electrodes

The procedure of Example 1 is followed. The varnish layer is 10μ thick.

(C) Deionisation of nitrobenzene

The electrode coated with a varnish according to the present example behaves similarly to the electrode prepared in Example 1.

EXAMPLE 5

(A) Preparation of a cation-exchange resin solution having sulphonic acid functions (a) Copolymerisation.—In 3600 cc. of dimethylsulphoxide 1073 g. of vinyl acetate and 170.5 g. of sodium vinylsulphonate having a purity of 73.2% are dissolved. The temperature is raised to 60° C. and 3.6 g. of azobisisobutyronitrile are added. Heating is continued for 16 hours. The whole is then poured into 16 l. of isopropanol and, after separation, the precipitate is washed with 2× 5 l. of isopropanol and dried in vacuo (100 mm. Hg) at 50° C. 1180 g. of copolymer are obtained.

(b) Saponification.—To 1000 cc. of a solution of 24 g. of potassium hydroxide in methanol a solution of 100 g. of the preceding copolymer in 3.2 l. of methanol is added with stirring in 2 hours at 50° C. The temperature and the stirring are maintained constant for 6 hours at 50° C. The product is filtered off and the precipitate is washed with 3× 500 cc. of methanol cooled at −5° C. Drying is effected as before. 95 g. of copolymer (saponification number=2) are obtained.

(c) Acidification.—The procedure of Example 1 is followed. After 15 successive passages of copolymer solution through the resin, the acidity of the solution becomes constant and equal to 1.3 meq./g. of dry resin.

(B) Crosslinking and preparation of an electrode

To 66 cc. of a 3.8% aqueous solution of the resin prepared as in the foregoing is added 0.41 cc. of a 60.8% solution of chlorinated polyethyleneglycol in dioxan (copolymer containing 48% of chlorine obtained from a polyethyleneglycol having a molecular weight of 600 by chlorination in accordance with Example C of United States Patent No. 2,416,880). The mixture is stirred at 90° C. for 7 hours and, after centrifuging, 30 cc. of methanol are added. This solution constitutes the varnish.

After coating a metallic member as in Example 1, the electrode is heated at 60° C. in vacuo (100 mm. Hg) for 15 hours. The varnish layer is 10μ thick.

(C) Deionisation of nitrobenzene

The electrode prepared in the present example gives results similar to those of Example 1.

We claim:

1. A compact or non-porous electric conductor at least partly coated with a layer of a copolymer of vinyl alcohol with a comonomer containing an ion exchange grouping said copolymer containing about 80 to about 96% by weight of vinyl alcohol units.

2. An electric conductor according to claim 1 in which the ion exchange grouping is a carboxyl, sulphonic acid or quaternary ammonium grouping.

3. An electric conductor according to claim 2 in which the comonomer is vinyl sulphonic acid, acrylic acid, methacrylic acid, vinyl phosphonic acid or a salt thereof, or a vinyl-N-alkylpyridinium salt.

4. An electric conductor according to claim 1 in which the copolymer is cross-linked.

5. An electric conductor according to claim 4 in which the cross-linking is effected by reaction with chlorinated polyethylene glycol.

References Cited

UNITED STATES PATENTS

| | | | |
|---|---|---|---|
| 3,024,207 | 3/1962 | Shaw et al. | 260—2.1 E |
| 3,247,133 | 4/1966 | Chen | 260—2.1 E |
| 3,351,487 | 11/1967 | Levine et al. | 117—138.8 R |
| 3,355,319 | 11/1967 | Rees | 117—138.8 E |
| 3,356,607 | 12/1967 | Eisenmann et al. | 204—180 P |
| 3,398,092 | 8/1968 | Fields et al. | 260—3.1 E |
| 3,475,300 | 10/1969 | Staal | 204—180 P |
| 3,510,418 | 5/1970 | Mizutani | 204—180 P |
| 3,453,354 | 7/1969 | Tejeda et al. | 117—21 |

FOREIGN PATENTS

| | | | |
|---|---|---|---|
| 7,054 | 7/1965 | Japan | 260—2.1 E |
| 1,156,236 | 10/1963 | Germany | 260—2.1 E |

OTHER REFERENCES

Trostyanskay, E. B., and A. S. Tevlina; "Synthesis of Ion-Exchange Films by Graft Co-polymerization," Vysokomolekul. Soedin. 5, (1) 44-8 (1963).

MURRAY KATZ, Primary Examiner

H. J. GWINNELL, Assistant Examiner

U.S. Cl. X.R.

117—161 UH, 229, 230; 204—290 R; 260—2.1 E